G. H. TALBOT.
MOLDING MACHINE.
APPLICATION FILED NOV. 8, 1919.

1,349,017.

Patented Aug. 10, 1920.
2 SHEETS—SHEET 1.

Fig. 1.

Inventor.
George H. Talbot
by Heard Smith & Tennant
Attys.

G. H. TALBOT.
MOLDING MACHINE.
APPLICATION FILED NOV. 8, 1919.
1,349,017.
Patented Aug. 10, 1920.
2 SHEETS—SHEET 2.
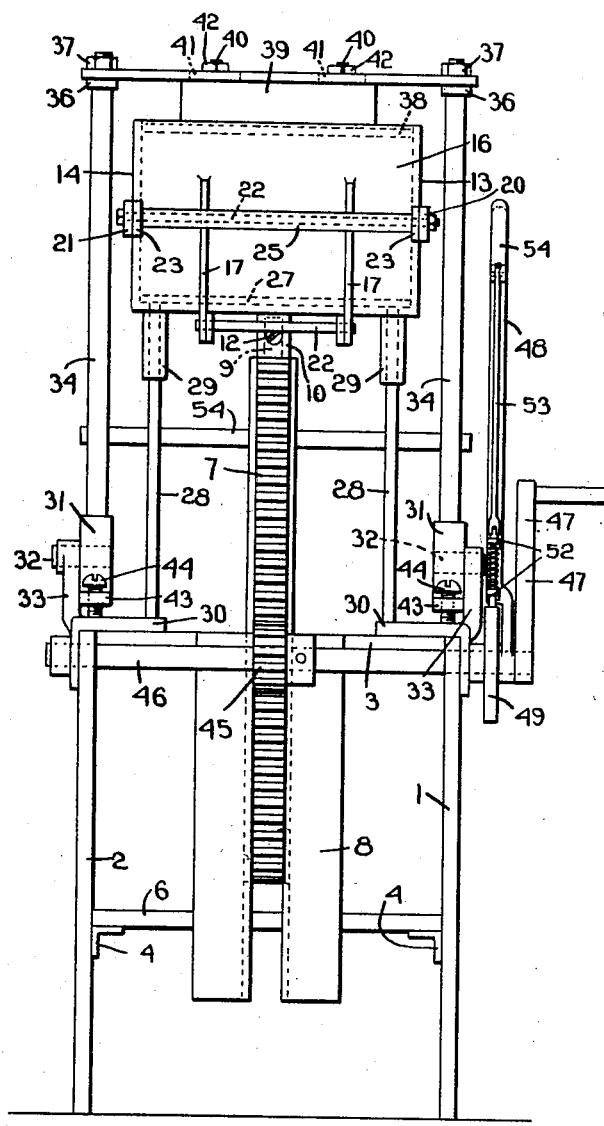
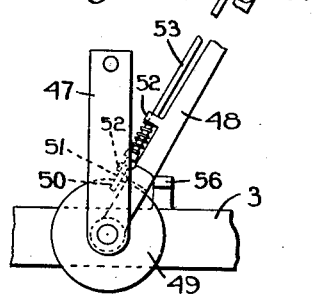
Inventor.
George H. Talbot
by Heard Smith & Tennant
Attys

UNITED STATES PATENT OFFICE.

GEORGE H. TALBOT, OF NEWTONVILLE, MASSACHUSETTS.

MOLDING-MACHINE.

1,349,017. Specification of Letters Patent. Patented Aug. 10, 1920.

Application filed November 8, 1919. Serial No. 336,708.

*To all whom it may concern:*

Be it known that I, GEORGE H. TALBOT, a citizen of the United States, and resident of Newtonville, county of Middlesex, State of Massachusetts, have invented an Improvement in Molding-Machines, of which the following description, in connection with the accompanying drawing, is a specification, like characters on the drawing representing like parts.

This invention relates to improvements in molding machines for forming blocks from plastic material and the principal object thereof is to provide a simplified type of molding machine in which the article may be readily subjected to a powerful pressure necessary to form the molded article and in which the molded article can be readily removed from the mold.

More specifically the invention relates to machines for molding cement or concrete blocks which can be transported from place to place and utilized by an ordinary unskilled workman to mold uniform blocks. In machines which have heretofore been constructed for molding cement blocks it has been customary to provide a knock-down type of mold in which the sides of the mold can be removed or swung aside to enable the pallet which forms a false bottom for the mold to be removed with the molded block upon it. In such constructions the pivoted supports or connections between the sides and the body of the mold rapidly become worn so that the sides are not properly held in place and the molding of a perfect block is prevented.

One of the objects of the present invention is to provide a mold in which the mold sides may be rigidly secured together and the molded block removed through the top of the mold.

A further object of the invention consists in providing a mold having a bottom and three rigid sides with one side which may be so connected thereto as to be removable to permit the use of a false side or facing plate when it is desired to form the block with a special design face such as a roughened face to simulate a cut stone.

A further object of the invention is to provide a vertically reciprocating mold having a pallet forming a false bottom for the mold and adapted to be removed with the molded block upon it, with mechanism for reciprocating the mold so constructed that the mold may be raised above or lowered below a filling position, means being provided to support the pallet when the mold is depressed below filling position and thereby force the molded article out through the top of the mold.

A further object of the invention is to provide a molding machine having a reciprocating mold with a follower which may be moved into or out of operative relation to the path of the mold, thereby avoiding any obstruction to the filling of the mold or the removal of the pallet supporting the molded block when the reciprocating mold has been depressed below molding position.

A further object of the invention is to provide means for reciprocating the mold which can be operated rapidly to raise the mold toward and from filling position and to provide a supplemental means whereby great power may be applied to compress the material between the mold and the follower.

This is accomplished in the present invention by means of a rack and pinion for moving the mold toward and from the follower and a supplemental power applying lever adapted to be connected to the pinion shaft when the mold is in operative relation to the follower thereby enabling the operator to force the mold against the follower with a most powerful pressure.

A further feature of the invention comprises the introduction of various adjustments which will enable the parts of the molding machine to be conveniently assembled into proper operative relation and maintained in such relation notwithstanding any wear or distortion which may occur during the operation of the machine.

Other objects and features of the invention will more fully appear from the following description and the accompanying drawings and will be pointed out in the annexed claims.

A preferred embodiment of the invention is disclosed herein as applied to a machine for molding cement blocks or other articles of like character.

In the drawings:

Figure 1 is a transverse central vertical sectional view of a machine embodying my invention, certain portions of the machine being shown in elevation, Fig. 2 is a front elevation of the machine, and, Fig. 3 is a detail view of the mechanism for operating the pinion shaft showing the means for detachably connecting the power applying lever to the shaft.

The molding machine illustrated in the accompanying drawings comprises a skeleton frame which desirably may have substantially A-shaped ends, comprising legs 1, 2, top members 3 connecting the upper ends of said legs and brace bars 4, connecting the legs intermediate of their ends, which are desirably formed of angle iron for rigidity in construction and to provide a convenient anchorage for transverse plates 5 and 6 which connect the A-shaped ends together. The mold is carried upon the upper end of a rack 7 which is reciprocably mounted in suitable ways 8 which are secured to the transverse plates 5 and 6.

The rack 7 is provided at its upper end with an extension 9, which is seated in a boss 10 projecting downwardly from the bottom 11 of the mold, and is secured in said boss by a set screw 12. The mold comprises the bottom 11, ends 13, 14 and a rear side 15 all of which may be integral or rigidly secured together. The front side 16 of the mold may also be formed rigidly with the other sides and bottom of the mold, but preferably is hinged thereto in order to enable the use of a false side or facing plate, as it is frequently desirable to form blocks having a face which simulates cut stone or bears some conventional design.

In the preferred construction shown herein the front side 16 is provided with a plurality of bosses 17 which extend below the bottom of the mold and are pivotally mounted upon a rod or shaft 18 which is carried in bosses 19 extending downwardly from the bottom of the mold and projecting beyond the front edge of the bottom of the mold. By thus locating the pivotal axis, about which the front of the mold is swung, below the bottom of the mold all portions of the front of the mold will, when swung about the pivotal axis, move substantially horizontally away from the molded article, thus enabling the molded block to be discharged through the open top of the mold with the face plate upon it, or permitting the facing plate to be removed before the block is discharged.

Any convenient means may be provided for securing the movable mold face in molding position and for permitting its removal therefrom. As illustrated herein arms 20, 21 are secured respectively to the ends 13, 14 and project a considerable distance beyond the front of the mold and are connected by a transverse rod 22 which serves as a pivot for a locking lever or latch. This lever desirably comprises a plurality of parallel members 23 having cam faced ends 24 which engage the outer face of the front plate 16 of the mold. The opposite ends of the members 23 are connected by a rod 25 which serves as a handle for operating the latch levers.

The cam faced ends of the levers are so constructed that when the levers 23 are in horizontal position the point of engagement of the end of the lever with the front of the mold will be in the same horizontal plane with the axis of the rod 24 upon which the lever is pivoted, thereby providing an effective lock. When the lever is raised the cam face permits the front to be swung outwardly so that the block with the facing plate upon it may be discharged from the mold.

The usual pallet 27 is provided for enabling the molded block to be raised from the mold and transported to such place as is required for the proper drying or baking of the block and the pallet therefore substantially conforms to the bottom of the mold and is adapted to form the false base of the mold.

In the use of the mold having rigid sides as above described it is necessary to have means for removing the block from the mold. The present invention contemplates providing means for reciprocating the mold which will enable the mold to be held in a filling position in which the pallet 27 will rest upon the bottom of the mold, then elevating the mold into coöperation with a follower which will serve to compress the material in the mold and finally lowering the mold sufficiently to cause the pallet with the molded block upon it to be forced through the top of the mold. This is accomplished by providing a series of pallet supporting rods 28 which extend telescopically through apertures in the bottom 11 of the mold, and through bosses 29 extending downwardly from the bottom, and are supported at their lower ends upon brackets 30 connected to the top plates 3 of the end frame.

In order to provide for compression of the material in the mold and to remove any obstruction to the filling of the mold or the removal of the molded blocks therefrom, a pivotally supported follower is provided which may be moved into coöperative relation to the path of the mold or swung away therefrom in such a manner as to render the mold freely accessible.

A preferred form of supporting mechanism comprises a pair of blocks 31 which are pivotally secured on studs 32 projecting from brackets 33 secured to the plates 3 of the frame. The blocks 31 are adjustably connected by a plurality of rods 34 to a follower supporting plate 35 by means of a pair of nuts 36, 37, upon the screw threaded upper ends of the rods 34, which engage the under and upper faces of the follower supporting plate 35.

The follower 38 is of a form to correspond to that of the mold and is connected to the follower supporting plate 35 by a spacing member 39 which has screw threaded stems 40 projecting upwardly therefrom through slots 41 which extend longitudinally of the central portion of the follower supporting plate, the studs being provided with clamping nuts 42 for securing the same in adjusted position.

By reason of this construction the follower may be adjusted longitudinally of the supporting plate in such a manner as to position it properly in respect to the path of the ends of the mold. In order to provide for the proper positioning of the follower over the mold when the same is swung into coöperative relation to the mold the blocks 31 are provided with extensions 43 having screws 44 adjustably mounted therein and adapted to engage the members 3 of the frame. By adjusting these screws the swinging movement of the follower may be so limited as to position it directly over the path of the mold so that when the mold is raised it will telescope over the follower.

Any suitable means may be provided for actuating the rack to reciprocate the mold. A convenient means comprises a pinion 45 which is fixedly secured upon a shaft 46 journaled in the downwardly extending webs of the top plates 3 and provided with a crank 47 which may be turned by the operator to raise and lower the mold. A relatively short crank may be employed for raising and lowering the mold quickly in order to place the mold in filling position and to lower it for the purpose of discharging the block through the top of the mold.

In order to provide means for applying the powerful pressure required to compress the material of the block a supplemental power applying lever 48 is pivotally mounted upon the pinion shaft 46 and is provided with means by which it may be detachably secured to the pinion shaft. The particular means illustrated comprises a disk 49 fixedly secured upon the pinion shaft 46 having one or more notches 50 which may be engaged by a bolt 51 slidably mounted in lugs or keepers 52 projecting from the side of the lever 48. The bolt 51 is connected by a link 53 to a hand grip 54 which is pivotally mounted adjacent the handle portion 55 of the lever.

A bracket 56 upon the top bar 3 of the frame extends in the path of the lever 48 and is so positioned that when the mold is in filling position the bolt 51 will be forced into the notch 50 of the disk 49.

In the operation of the machine the operator turns the crank 47 until the mold reaches filling position and the bolt 52 is forced into the notch 50 of the disk. The mold is then filled. After the mold is filled and the excess of material removed therefrom the follower support is swung about its pivot until the follower is positioned directly above the top of the mold. The operator then grasps the handle 55 of the lever 48 and rotates it in a counterclockwise direction thereby raising the mold and forcing the material therein against the follower until the block is compressed sufficiently. The lever is then moved in the reverse direction until the mold again assumes filling position when the follower support is swung aside. The operator then grasps the hand grip 54 and releases the bolt 51 from engagement with the notch 50 at the same time taking hold of the crank and rotating it in a clockwise direction to lower the mold. When the mold is in filling position the upper ends of the rods 28 engage the pallet 27 so that as the mold is lowered the pallet with the block upon it is forced upwardly through the top of the mold. The operator can then take hold of the pallet and remove the molded block.

If the facing plate is used the locking lever 23 will of course be actuated to permit the movable side of the mold to be swung outwardly while the mold is in filling position so that the withdrawal of the mold from the block will not injure the face of the mold.

It will be understood that the embodiment of the invention disclosed herein is illustrative and not restrictive and that various modifications in construction and arrangement of parts may be made within the spirit and scope of the following claims.

Having thus described my invention what I claim as new and desire to secure by Letters Patent is:

1. A molding machine comprising a frame, a mold having a removable pallet normally carried by the bottom of the mold reciprocably mounted thereon, means for reciprocating said mold, a follower and means for selectively positioning said follower in operative relation to the mold and for removing the same from said operative relation to permit filling of the mold and removal of the molded article, means for reciprocating said mold toward and from said follower and means for discharging the pallet with the molded article thereon from said mold.

2. A molding machine comprising a frame, a vertically reciprocable mold having a removable pallet normally carried by the bottom of the mold, a follower, a follower support pivotally mounted upon said frame and movable to position said follower into and out of operative relation to said mold and means for reciprocating said mold toward and from said follower and means for discharging the pallet with the molded article thereon from the mold.

3. A molding machine comprising a frame, a vertically reciprocable mold, a follower adjustably mounted on said frame and adapted to be swung about its pivot to position said follower in and out of operative relation to said mold, adjustable means for limiting the swinging movement of said follower support to cause the follower to register with the mold and means for reciprocating said mold toward and from said follower.

4. A molding machine comprising a frame, a vertically reciprocable mold, a follower support comprising blocks pivotally mounted on said frame, a follower supporting plate, a follower adjustably secured to said supporting plate at a distance therefrom, tension members connecting said follower supporting plate to said blocks and means for reciprocating said mold toward and from said follower.

5. A molding machine comprising a frame, a vertically reciprocable mold, a follower support comprising blocks pivotally mounted on said main frame, set screws adjustably mounted on said blocks adapted to engage said frame to limit the swinging movement of said blocks, a follower supporting plate, a follower secured to said plate at a distance therefrom, tension members connecting said follower supporting plate to said blocks and means for reciprocating said mold toward and from said follower.

6. A molding machine comprising a frame, a mold reciprocable vertically relatively thereto having a removable pallet normally carried by the bottom of the mold, a follower, means for positioning said follower into and out of operative relation to said mold, means for reciprocating said mold upwardly from filling position into coöperative relation to said follower and operable to depress said mold below filling position and means for raising said pallet from said mold when the mold is depressed below filling position whereby the molded article will be forced from the mold.

7. A molding machine comprising a frame, a mold having a bottom and ends and sides rigid therewith, a pallet normally carried by the bottom of said mold, a follower, means for positioning said follower into and out of operative relation to said mold, means for moving said mold upwardly toward said follower into coöperative relation thereto, rods telescopically mounted in the bottom of said mold adapted to engage said pallet when the mold is depressed below filling position to force the molded article from said mold.

8. A molding machine comprising a frame, a mold, a rack secured to said mold mounted in ways in said frame, a pinion engaging said rack, and means for actuating said pinion to cause said rack to reciprocate said mold, a follower and means for positioning said follower into and out of operative relation to said mold to permit the filling of the mold, the compression of the material to be molded and the removal of the molded article therefrom.

9. A molding machine comprising a frame, a mold, a rack secured to said mold, mounted in ways in said frame, a pinion engaging said rack, a pinion shaft having a crank thereon operable to rotate said pinion to reciprocate said mold, a power applying lever pivotally mounted on said shaft, means for connecting and releasing said power applying lever from said shaft and a follower in coöperative relation to said mold.

10. A molding machine comprising a frame, a mold, a rack secured to said mold mounted in ways in said frame, a pinion engaging said rack, a pinion shaft having a crank thereon operable to rotate said pinion to reciprocate said mold, a notched disk fixedly secured to said pinion shaft, a power applying lever pivotally mounted on said shaft and means carried by said lever adapted to be engaged and disengaged from the notch in said disk and a follower in coöperative relation to said mold.

11. A molding machine comprising a mold having a bottom and sides and an open top, a removable pallet carried by said bottom one of said sides being movable laterally to permit the molded block to be readily discharged, and means for discharging the pallet with the molded block thereon from said mold.

12. A molding machine comprising a mold having a bottom, three sides rigid therewith and a fourth side pivotally secured to said bottom upon an axis located below the plane of the bottom, whereby a facing plate may be supported by said movable mold side and the movable mold side swung outwardly to permit the molded block to be discharged through the top of the mold with the facing plate adhering thereto and means for discharging the molded block from the mold.

13. In a molding machine comprising a mold having a bottom, three sides rigid therewith and a fourth side pivotally secured to said bottom upon an axis located below the plane of the bottom, whereby a facing plate may be supported by said movable mold side and the movable side swung outwardly to permit the mold block to be discharged through the top of the mold with the facing plate adhering thereto, latching means comprising a lever pivotally connected to the ends of the mold and having a cam faced end engaging the outer wall of said movable side operable to lock the movable side in molding position or to enable the same to be swung outwardly, and means for discharging the molded block through the top of the mold.

14. In a molding machine comprising a mold having a bottom, three sides rigid therewith and a fourth side pivotally secured to said bottom upon an axis located below the plane of the bottom, whereby a facing plate may be supported by said movable mold side and the movable side swung outwardly to permit the molded block to be discharged through the top of the mold with the facing plate adhering thereto, latching means comprising arms extending laterally from the ends of the mold, a rod mounted in said arms, a plurality of levers pivotally mounted on said rod having cam faced ends adapted to engage the outer wall of the movable side of the mold and a handle connecting said levers together whereby said levers may be operated to lock the mold side in molding position or to enable it to be swung outwardly and means for discharging the molded block from the mold.

15. A molding machine comprising a frame, a vertically reciprocable mold, a follower support comprising blocks pivotally mounted on said frame, a follower supporting plate, a follower adjustably secured to said supporting plate at a distance therefrom, tension members connected to said blocks and adjustably connected to said follower supporting plate and means for reciprocating said mold toward and from said follower.

In testimony whereof I have signed my name to this specification.

GEORGE H. TALBOT.